(12) United States Patent
Bushman et al.

(10) Patent No.: US 7,823,779 B2
(45) Date of Patent: Nov. 2, 2010

(54) COMPLIMENTARY OPTICAL IMAGE AND RADIO FREQUENCY SIGNAL PROCESSING

(75) Inventors: Serge J. L. Bushman, Overland Park, KS (US); Michael Gailloux, Overland Park, KS (US); Carl Joseph Persson, Olathe, KS (US); Thomas Henry Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 201 days.

(21) Appl. No.: 12/131,218

(22) Filed: Jun. 2, 2008

(65) Prior Publication Data

US 2009/0298534 A1 Dec. 3, 2009

(51) Int. Cl.
*G06K 7/00* (2006.01)
*G06K 7/10* (2006.01)

(52) U.S. Cl. ............... 235/440; 235/435; 235/439; 235/462.46

(58) Field of Classification Search ............ 235/462.46
See application file for complete search history.

(56) References Cited

U.S. PATENT DOCUMENTS

| | | | | |
|---|---|---|---|---|
| 5,382,784 | A * | 1/1995 | Eberhardt | 235/462.46 |
| 5,602,377 | A * | 2/1997 | Beller et al. | 235/462.15 |
| 6,264,106 | B1 * | 7/2001 | Bridgelall | 235/462.46 |
| 6,816,075 | B2 | 11/2004 | Grunes et al. | |
| 7,068,170 | B2 | 6/2006 | Green | |
| 2002/0078363 | A1 * | 6/2002 | Hill et al. | 713/189 |
| 2003/0156032 | A1 * | 8/2003 | Adams et al. | 340/572.7 |
| 2003/0229678 | A1 | 12/2003 | Wen et al. | |
| 2005/0011957 | A1 * | 1/2005 | Attia et al. | 235/462.46 |
| 2005/0044179 | A1 | 2/2005 | Hunter | |
| 2007/0083381 | A1 | 4/2007 | Farrell et al. | |
| 2007/0188306 | A1 * | 8/2007 | Tethrake et al. | 340/10.51 |
| 2007/0290045 | A1 * | 12/2007 | Cisar | 235/462.46 |
| 2009/0086045 | A1 * | 4/2009 | Giebel et al. | 348/222.1 |

FOREIGN PATENT DOCUMENTS

| | | |
|---|---|---|
| JP | 2008090512 | 4/2008 |
| WO | 2006107610 | 10/2006 |

OTHER PUBLICATIONS

Mobilementalism.com, "Prototype Nokia 3220 NFC RFID Phone Could Reshape Society," May 29, 2008, 4 pages, Mobile Mentalism.com, http://mobilementalism.com/2005/12/12/prototype-nokia-3220-nfc-rfid-phone-could-reshape-society.
Picturephoning.com, "Wireless ID Skin Patch Technology," Nov. 6, 2007, 1 page, picturephoning.com, http://www.textually.org/picturephoning/archives/2007/11/017888.htm.
Giles Manias, "Factors to Consider When Choosing a RFID System," May 29, 2008, 3 pages, Food Manufacturing, http://www.foodmanufacturing.com/scripts/ShowPR~RID~7222.asp.

* cited by examiner

*Primary Examiner*—Michael G Lee
*Assistant Examiner*—Matthew Mikels (57) ABSTRACT

A wireless communication device optically receives an image and processes the optically received image to generate image data. The wireless communication device receives a Radio Frequency (RF) signal and processes the RF signal to derive an image data processing parameter. The image data processing parameter could be an encryption key, authentication code, access code, or some other parameter. The wireless communication device processes the image data and the image data processing parameter to convert the image data into a different format. The different format could be decrypted, authenticated, accessed, or some other converted form of image data.

20 Claims, 7 Drawing Sheets

COMPLIMENTARY OPTICAL IMAGE AND RADIO FREQUENCY SIGNAL PROCESSING

TECHNICAL BACKGROUND

A Radio Frequency (RF) tag transmits an RF signal at a specific frequency in response to receiving an excitation signal. The RF signal often identifies a product code. An RF receiver receives the RF signal and processes the product code to display associated product information. The RF receiver may also transmit the excitation signal.

Bar codes encode various types of information, such as bar codes. Some wireless telephones with cameras scan and process these bar codes. For example, a camera-equipped wireless telephone may scan and process a bar code to download information from a web site indicated by the bar code.

OVERVIEW

A wireless communication device optically receives an image and processes the optically received image to generate image data. The wireless communication device receives a Radio Frequency (RF) signal and processes the RF signal to derive an image data processing parameter. The image data processing parameter could be an encryption key, authentication code, access code, or some other parameter. The wireless communication device processes the image data and the image data processing parameter to convert the image data into a different format. The different format could be decrypted, authenticated, accessed, or some other converted form of image data.

DETAILED DESCRIPTION

Figure 1:
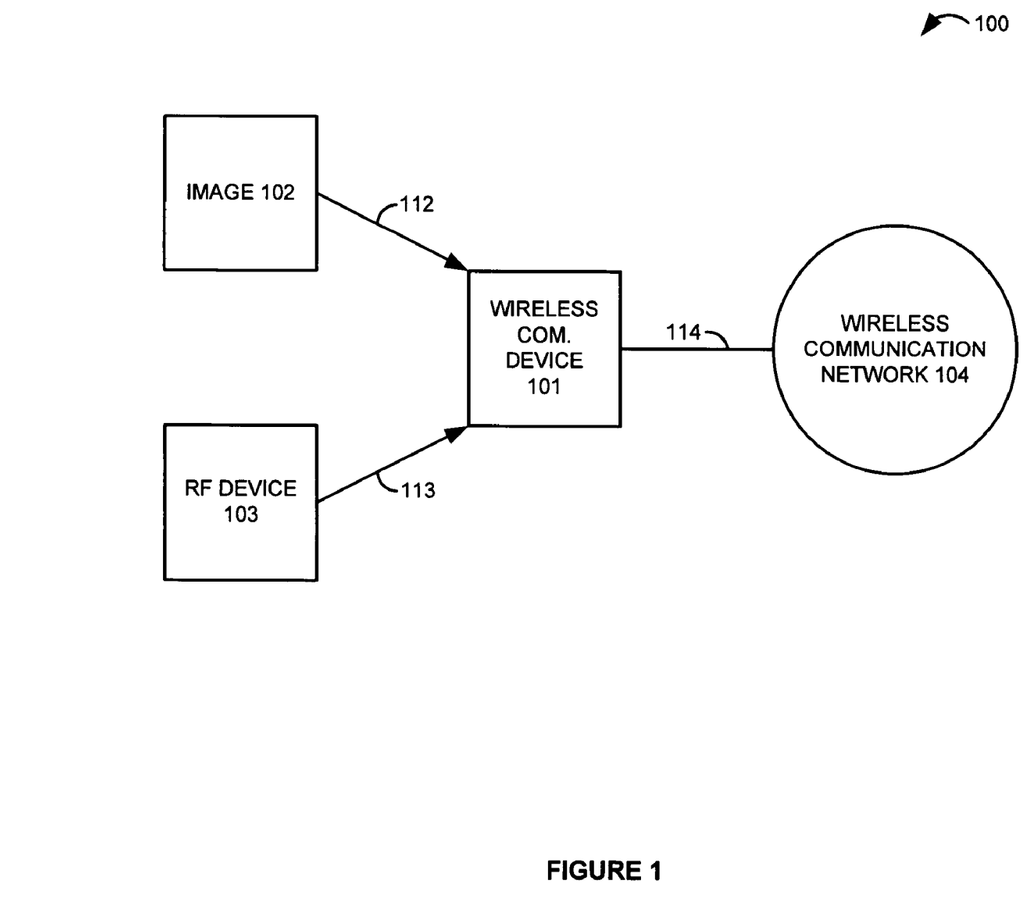
FIG. 1 is a block diagram that illustrates a communication system.

FIG. 1 is a block diagram that illustrates communication system 100. Communication system 100 comprises wireless communication device 101, image 102, Radio Frequency (RF) device 103, and wireless communication network 104. Optical signal 112 representing image 102 propagates from image 102 to wireless communication device 101. RF device 103 transmits RF signal 113, and wireless communication device 101 receives RF signal 113. Although not required, wireless communication device 101 may transmit an excitation signal that drives RF device 103 to transmit RF signal 113. Although not required, image 102 could be printed in RF ink that is configured to transmit RF signal 113, and thus, image 102 and RF device 103 would be integrated together.

Wireless communication device 101 comprises a telephone, transceiver, computer, digital assistant, mobile Internet access device, or some other wireless communication apparatus—including combinations thereof. Image 102 comprises a bar code, picture, graphic, printed data set, or some other optically visible item that encodes image data in a first format. RF device 103 comprises an RF tag, RF Identification (ID), or some other device that transmits RF signal 113 to indicate an image data processing parameter. RF device 103 may be passive, semi-passive, or active.

Wireless communication network 104 comprises wireless access points, telephony switches, internet routers, network gateways, computer systems, communication links, or some other type of communication equipment—including combinations thereof. Wireless communication device 101 and communication network 104 wirelessly exchange communications over wireless link 114. Wireless link 114 uses the air as the transport media. Wireless link 114 could use various protocols, such as wireless fidelity, code division multiple access, worldwide interoperability for microwave access, internet, telephony, or some other communication format—including combinations thereof.

Figure 2:
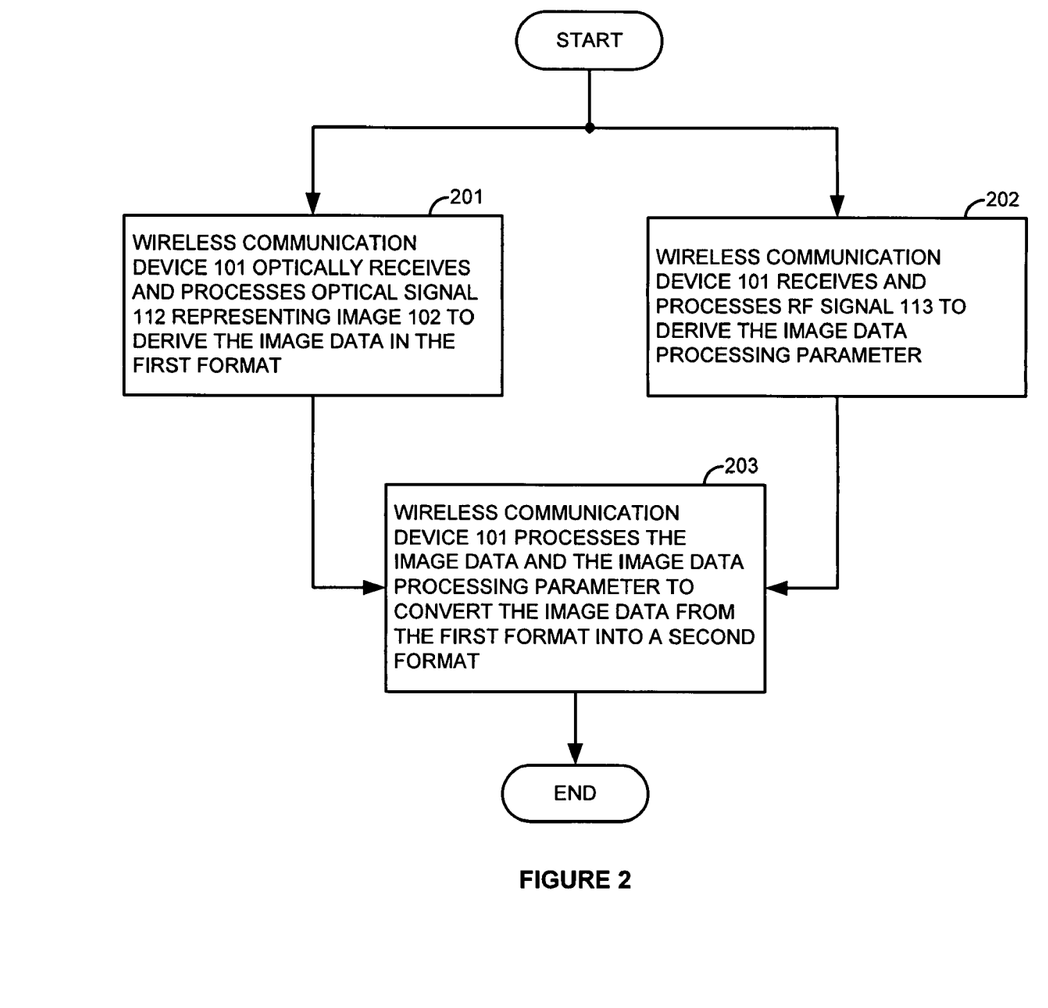
FIG. 2 is a flow diagram that illustrates the operation of the communication system.

FIG. 2 is a flow diagram that illustrates the operation of communication system 100. The operation starts when wireless communication device 101 optically receives and processes optical signal 112 representing image 102 to derive the image data in a first format (201). Wireless communication device 101 also receives and processes RF signal 113 to derive the image data processing parameter (202). Note that operations 201-202 may occur contemporaneously, operation 201 may precede operation 202, or operation 202 may precede operation 201. Wireless communication device 101 processes the image data and the image data processing parameter to convert the image data from the first format into a second format (203). The second format is different from the first format.

For example, the image data could be encrypted (the first format), and the image data processing parameter could be the encryption key. Wireless communication device 101 could decrypt the encrypted image data with the key to produce decrypted image data (the second format). In another example, the image data could be unauthenticated (the first format), and the image data processing parameter could be an authentication code. Wireless communication device 101 could use the authentication code to authenticate the image data (the second format).

In another example, the image data processing parameter could be an access code. Wireless communication device 101 could wirelessly transmit the image data and the access code over wireless link 114 to communication network 104. Communication network 104 would transfer the image data and the access code to a remote system (not shown). In response to the access code, the remote system would transfer the image data in the second format to wireless communication device 101 over network 104 and link 114.

Although not required, image 102 may encode image data that includes an instruction. Wireless communication device 101 could process the instruction, and in response, transmit the RF excitation signal and/or receive RF signal 113 at a specific frequency. Although not required, RF device 103 may be configured to transmit RF signal 103 only within a given range. Thus, wireless communication device 101 would need to be proximate (in range) to RF device 103 to receive RF signal 113 and convert the image data into the new format. The proximity could be used to ensure that the image data conversion occurs at a given location (as opposed to data conversion at a remote location with a counterfeit copy of the image).

Figure 3:
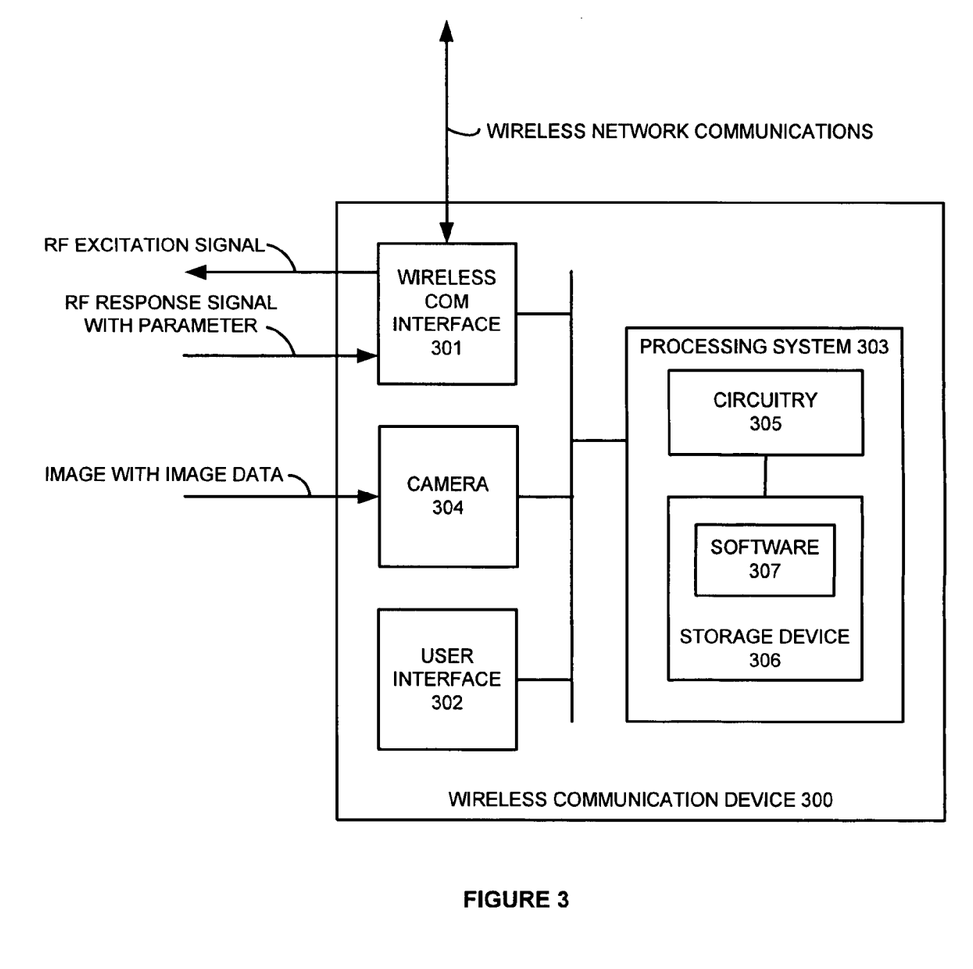
FIG. 3 is a block diagram that illustrates a wireless communication device.

FIG. 3 is a block diagram that illustrates wireless communication device 300 that provides complimentary image-RF signal processing. Wireless communication device 300 comprises wireless communication interface 301, user interface 302, processing system 303, and camera 304. Processing system 303 is linked to wireless communication interface 301, user interface 302, and camera 304. Processing system 303 includes circuitry 305 and storage device 306 that stores operating software 307.

Wireless communication interface 301 comprises components that transmit and receive wireless signals under the control of processing system 303. Wireless communication interface 301 comprises a first RF transceiver and antenna for wireless network communications and a second RF transceiver and antenna for RFID communications. In particular, wireless communication interface 101 transmits an RF excitation signal, and in response, receives an RF response signal including an image data processing parameter.

User interface 302 comprises components that interact with the user under the control of processing system 303. User interface 302 may include a speaker, microphone, buttons, lights, display screen, touch screen, touch pad, scroll wheel, or some other user input/output apparatus. Camera 304 comprises components configured to receive optical signals that represent images, convert the optical signals into image data, and transfer the image data to processing system 303. Camera 304 operates in response to instructions from processing system 303.

Circuitry 305 comprises microprocessor and other circuitry that retrieves and executes operating software 307 from storage device 306 to control wireless communication interface 301, user interface 302, and camera 304. Storage device 306 comprises a disk drive, flash drive, memory circuitry, or some other memory device. Operating software 307 comprises computer programs, firmware, or some other form of machine-readable processing instructions. Operating software 307 may include an operating system, utilities, drivers, network interfaces, applications, or some other type of software. When executed by circuitry 305, operating software 307 directs processing system 303 to operate wireless communication device 300 as described herein. In particular, operating software 307 directs processing system 303 to perform complimentary image and RF signal processing.

Figure 4:
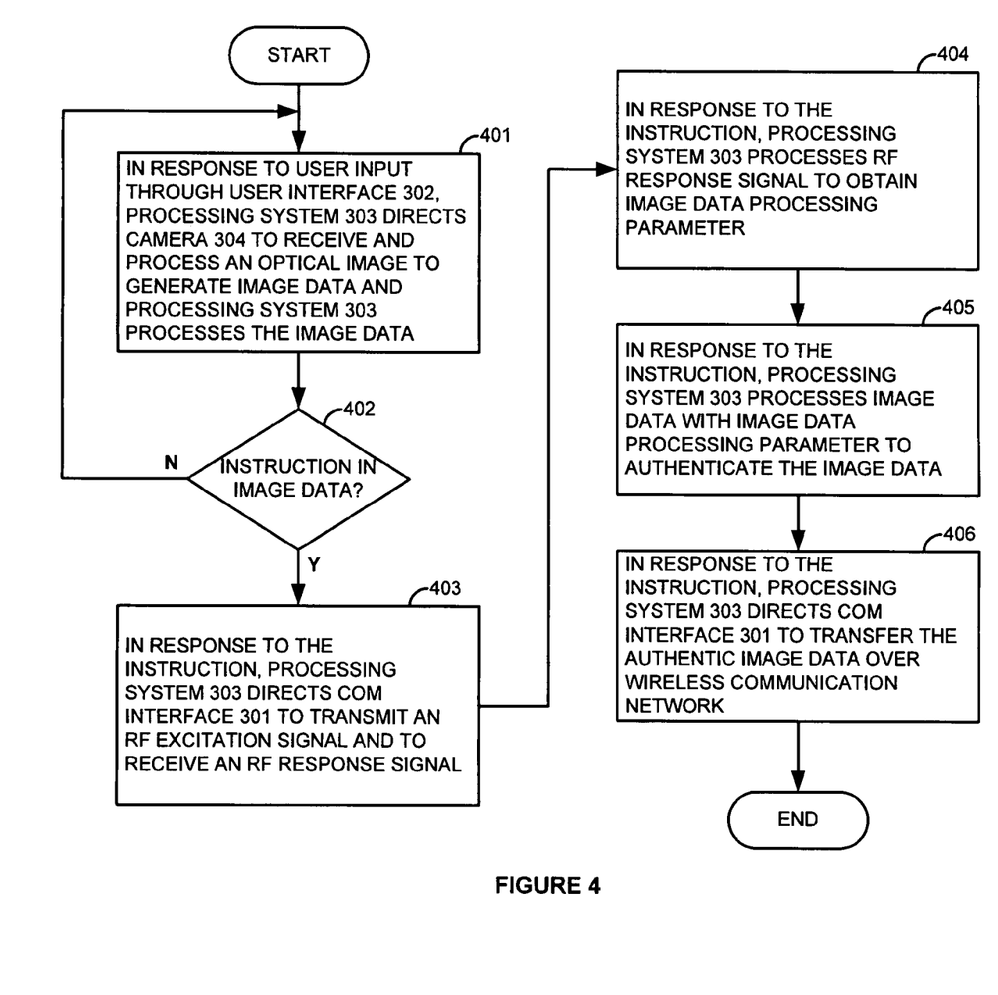
FIG. 4 is a flow diagram that illustrates the operation of the communication device.

FIG. 4 is a flow diagram that illustrates the operation of wireless communication device 300 to perform complimentary image and RF signal processing to prevent image counterfeiting. The operational sequence begins when a user provides a user input through user interface 301, and in response, processing system 303 directs camera 304 to optically receive and process an image to generate image data (401). Processing system 303 processes the image data, and if no instruction is included in the image data (402), processing system 303 returns to the start of the operational sequence.

If an instruction is included in the image data (402), processing system 303 processes the instruction to direct wireless communication interface 301 to transmit an RF excitation signal at a first frequency and receive an RF response signal at a second frequency (403). Note that the range on the RF excitation signal and the RF response signal is physically limited. Some RFID systems have a short range of only 10 feet or so, while others can operate up to 1000 feet or so, but in either case, wireless communication device 300 needs to be proximate to both the image and the RF device to perform authentication. Thus, wireless communication device 300 cannot perform authentication with a counterfeit copy of the image if it is also miles (or so many feet) away from the RF device.

In response to the instruction, processing system 303 processes the RF response signal to obtain an image data processing parameter (404). In response to the instruction, processing system 303 processes the image data with the image data processing parameter to authenticate the image data (405). Authentication may comprise matching a code from the image data with an authentication code from the image data processing parameter. Other authentication techniques could be used. In response to the instruction, processing system 303 directs wireless communication interface 301 to transmit the authentic image data over the wireless communication network (406).

Note that in a complimentary fashion, the RF signal is used to authenticate the image data. This complimentary processing prevents a dishonest user from simply processing a counterfeit version of the image at an unauthorized location where the RF response signal is not available.

Figure 5:
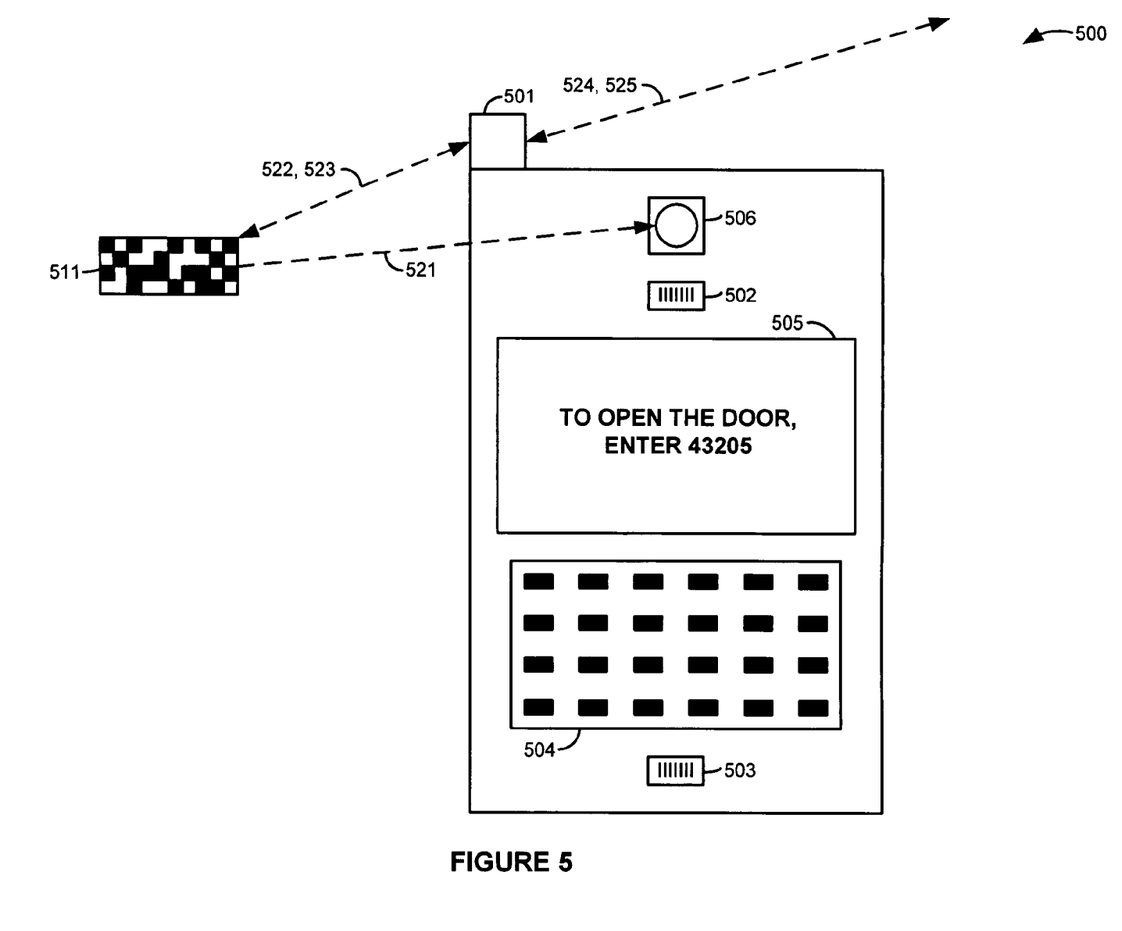
FIG. 5 is a sketch that illustrates a wireless telephone providing complimentary image/RF signal processing.

FIG. 5 is a sketch that illustrates wireless telephone 500 providing complimentary image/RF signal processing to provide physical access at a location. Wireless telephone 500 includes antenna system 501, speaker 502, microphone 503, keypad 504, display 505, and camera 506. Antenna system 501 has both RFID and RF network communication capability. Two-dimensional bar code 511 is printed on a tag with RFID ink. Wireless telephone 500 uses camera 506 to receive and process bar code 511. Bar code 511 indicates the need for physical access through a door and includes instructions. In response to the instructions, wireless telephone 500 uses antenna system 501 to transmit RF excitation signal 522 and receive RF response signal 523. RF response signal 523 includes an access code. In response to the instructions, wireless telephone 500 uses antenna system 501 to transmit wireless network signal 524 indicating the need for physical access through the door and the access code, and to receive wireless network signal 525. Wireless network signal 525 indicates a door entry code to obtain physical access through the door. Wireless telephone 500 uses display 505 to show the door entry code to the user.

Figure 6:
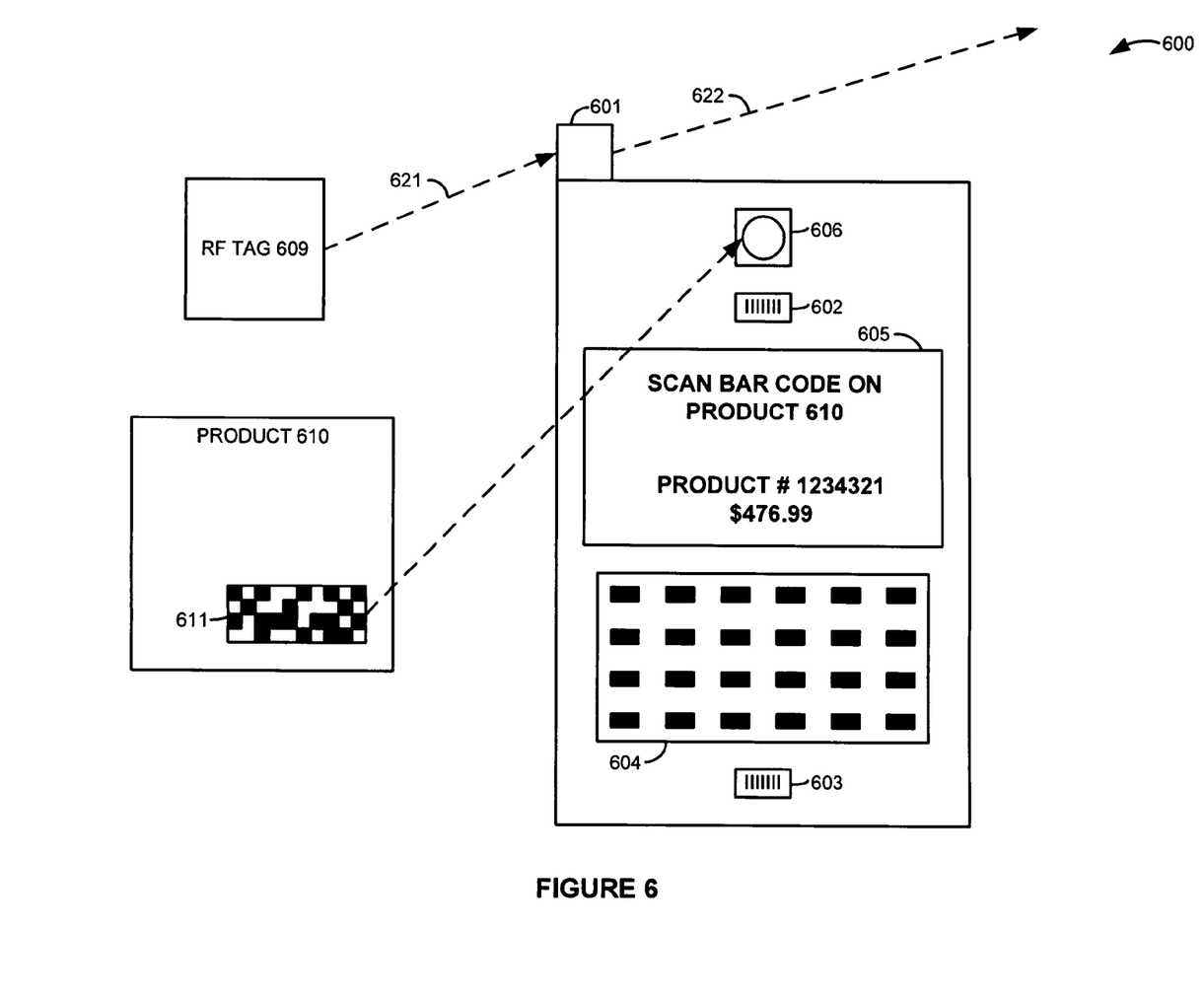
FIG. 6 is a sketch that illustrates a wireless telephone providing complimentary image/RF signal processing.

FIG. 6 is a sketch that illustrates wireless telephone 600 providing complimentary image/RF signal processing to provide product information. Wireless telephone 600 includes antenna system 601, speaker 602, microphone 603, keypad 604, display 605, and camera 606. Antenna system 601 has both RFID and RF network communication capability. RF tag 609 transmits RF signal 621 with an image data processing parameter. Product 610 has two-dimensional bar code 611 that encodes a product number and price.

Wireless telephone 600 uses antenna system 601 to receive RF signal 621 with the image data processing parameter. The processing parameter includes an instruction to display a user notification to scan bar code 611. Wireless telephone 600 uses display 605 to show the notification, "scan bar code on product 610." Thus, the RF signal notifies the user that a bar code is present for scanning. This might be helpful in a warehouse scenario where many large crates have relatively small bar codes that are hard to easily see and scan. In response to the notification, the user operates camera 606 to receive and process bar code 611. Bar code 611 indicates a product number and price. In response to the image data processing parameter, wireless telephone 600 uses display 605 to show the product number and price. Wireless telephone 600 may also use antenna system 601 to transmit wireless network signal 622 indicating the product number and price.

Figure 7:
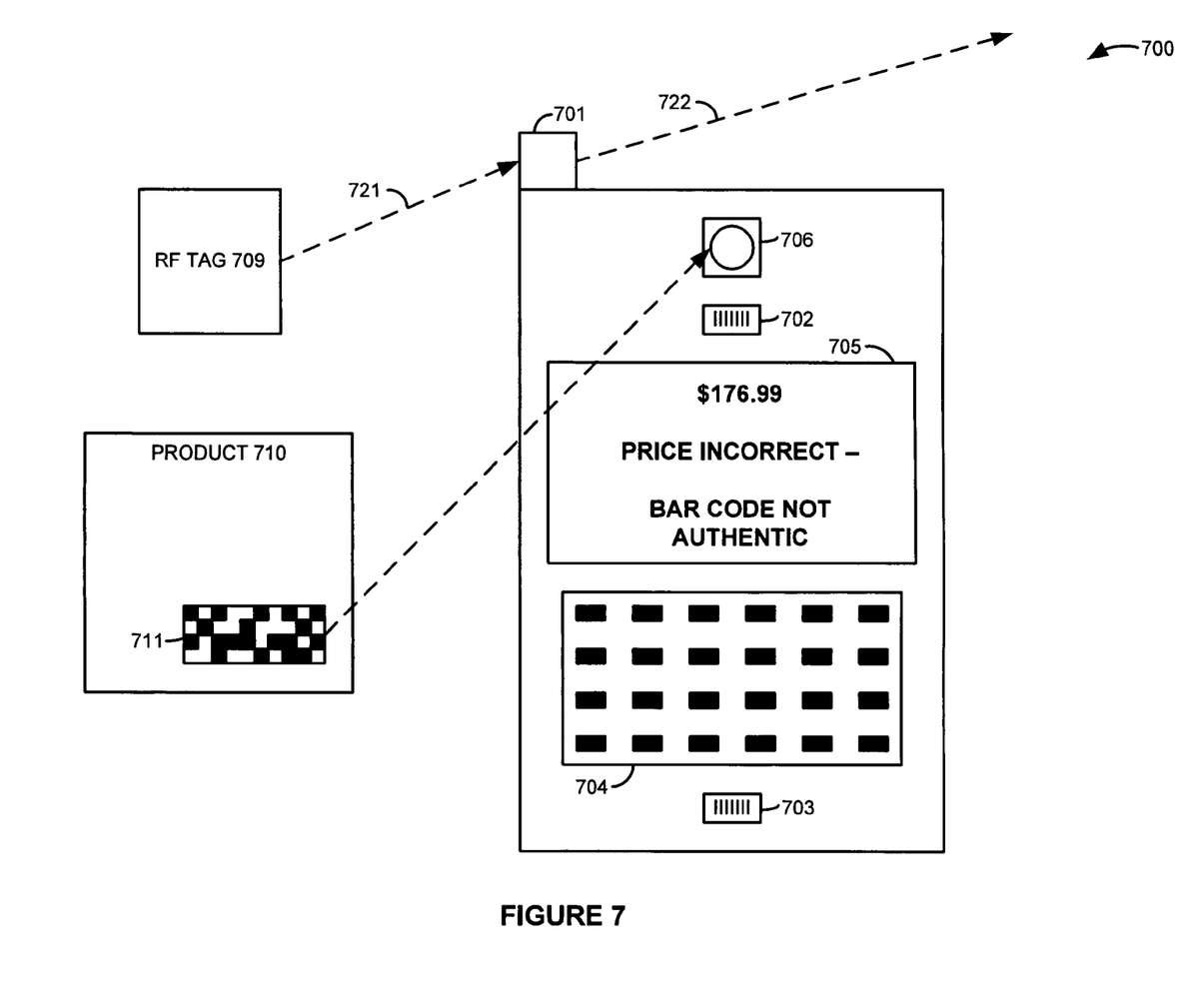
FIG. 7 is a sketch that illustrates a wireless telephone providing complimentary image/RF signal processing.

FIG. 7 is a sketch that illustrates wireless telephone 700 providing complimentary image/RF signal processing to authenticate a bar code. Wireless telephone 700 includes antenna system 701, speaker 702, microphone 703, keypad 704, display 705, and camera 706. Antenna system 701 has both RFID and RF network communication capability.

RF tag 709 is an active RFID. RF tag 709 transmits RF signal 721 with an image data processing parameter in the form of an authentication code for the legitimate bar code of product 710. RF signal 721 also has a very limited range of 10 feet, so RF tag 709 and product 710 are proximately located less than 10 feet from one another. Product 710 has two-dimensional bar code 711 that encodes a price for product 710. Two-dimensional bar code 711 should also encode the correct authentication number, but in this example, a dishonest person has removed the authentic bar code from product 710 and replaced it with illegitimate bar code 711. Illegitimate bar code 711 has the wrong authentication number—and a much lower price.

Wireless telephone 700 uses antenna system 701 to receive RF signal 721 with the authentication code. Camera 706 operates to receive and process bar code 711 that includes the product price. Wireless telephone 700 displays "$176.99" which is improperly priced too low as mentioned above. Wireless telephone 700 also compares the authentication code from RF signal 721 to the authentication code from bar code 711, and since they do not match, wireless telephone displays 700 "price is not accurate—bar code not authentic." Wireless telephone 700 also uses antenna system 701 to transmit wireless network signal 722 indicating to a security system (not shown) that an illegitimate bar code with an incorrect price has been discovered.

Note that RF signal 721 adds a complimentary layer of security to product bar codes and prices. First, the limited physical range of RF signal 721 only allows authentication to occur only when performed next to product 710. Second, the use of authentication codes prevents a counterfeit bar code from being placed on product 710 to obtain a much lower price. Third, RF tag 709 may be hidden (and RF signal 721 is invisible) so the extra layer of security cannot be readily detected by a dishonest person.

Although the examples described above for FIGS. 5-7 use wireless telephones, wireless communication devices 101 and 300 could be configured to operate in a similar manner.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
   optically receiving an image into the wireless communication device and processing the optically received image to generate image data, wherein the image data comprises an instruction;
   processing the instruction to determine an excitation signal;
   transmitting the excitation signal;
   in response to the excitation signal, receiving a Radio Frequency (RF) signal into the wireless communication device and processing the RF signal to derive an image data processing parameter; and
   processing the image data and the image data processing parameter to convert the image data into a different format.

2. The method of claim 1 wherein transmitting the excitation signal comprises transmitting the excitation signal from the wireless communication device to drive transmission of the RF signal.

3. The method of claim 1 wherein the instruction directs the wireless communication device to transmit the excitation signal and wherein transmitting the excitation signal comprises transmitting the excitation signal in response to processing the instruction.

4. The method of claim 1 wherein the image data indicates an RF frequency for the RF signal and wherein receiving the RF signal comprises receiving the RF signal at the RF frequency.

5. The method of claim 1 wherein the image data is encrypted, wherein the image processing parameter comprises an encryption key, and wherein processing the image data and the image processing parameter to convert the image data into the different format comprises decrypting the encrypted image data with the encryption key.

6. The method of claim 1 wherein the image data is unauthenticated, wherein the image processing parameter comprises an authentication code, and wherein processing the image data and the image processing parameter to convert the image data into the different format comprises authenticating the image data with the authentication code.

7. The method of claim 1 wherein the image processing parameter comprises an access code, wherein processing the image data and the image processing parameter to convert the image data into the different format comprises wirelessly transmitting the image data and the access code and wirelessly receiving the image data in the different format, wherein a remote system receives the image data and the access code transmitted by the wireless communication device and transfers the image data in the different format to the wireless communication device in response to the access code.

8. The method of claim 1 wherein the image comprises RF ink that transmits the RF signal.

9. The method of claim 1 wherein the image comprises a two-dimensional bar code.

10. The method of claim 1 wherein the wireless communication device comprises a mobile Internet access device.

11. A wireless communication device comprising:
    a camera configured to optically receive an image and process the optically received image to generate image data, wherein the image data comprises an instruction;
    a processing system configured to process the instruction to determine an excitation signal;
    a Radio Frequency (RF) communication interface configured to transmit the excitation signal;
    in response to the excitation signal, the RF communication interface configured to receive an RF signal and process the received RF signal to generate signal data;
    the processing system configured to process the signal data to derive an image data processing parameter and to process the image data and the image processing parameter to convert the image data into a different format.

12. The wireless communication device of claim 11 wherein the RF communication interface configured to transmit the excitation signal comprises the RF communication interface configured to transmit the excitation signal to drive transmission of the RF signal.

13. The wireless communication device of claim 11 wherein the instruction directs the RF communication interface to transmit the excitation signal and wherein the processing system is configured, in response to processing the instruction, to direct the RF communication interface to transmit the excitation signal.

14. The wireless communication device of claim 11 wherein the image data indicates an RF frequency for the RF signal and wherein the processing system is configured to direct the RF communication interface to receive the RF signal at the RF frequency.

15. The wireless communication device of claim 11 wherein the image data is encrypted, wherein the image processing parameter comprises an encryption key, and wherein the processing system is configured to decrypt the encrypted image data with the encryption key to convert the image data into the different format.

16. The wireless communication device of claim 11 wherein the image data is unauthenticated, wherein the image processing parameter comprises an authentication code, and wherein the processing system is configured to authenticate the image data with the authentication code to convert the image data into the different format.

17. The wireless communication device of claim 11 wherein the image processing parameter comprises an access code, wherein the processing system is configured to direct the RF communication interface to transmit the image data and the access code for delivery to a remote system and to receive the image data in the different format transmitted by the remote system, wherein the remote system transfers the image data in the different format in response to receiving the access code.

18. The wireless communication device of claim 11 wherein the image comprises a two-dimensional bar code.

19. The wireless communication device of claim 11 wherein the RF communication interface is configured to transmit an excitation signal and wherein the image comprises RF ink that transmits the RF signal responsive to the excitation signal.

20. The wireless communication device of claim 11 wherein the wireless communication device comprises a mobile Internet access device.

* * * * *